United States Patent
Newcombe et al.

(10) Patent No.: US 10,032,435 B2
(45) Date of Patent: Jul. 24, 2018

(54) ACCELERATED IMAGE GRADIENT BASED ON ONE-DIMENSIONAL DATA

(71) Applicant: Nagravision S.A., Cheseaux-sur-Lausanne (CH)

(72) Inventors: Patrick Newcombe, Vale of Glamorgan (GB); Douglas Brunel Gore, Pontyclun (GB)

(73) Assignee: Nagravision S.A., Cheseaux-sur-Lausanne (CH)

( * ) Notice: Subject to any disclaimer, the term of this patent is extended or adjusted under 35 U.S.C. 154(b) by 349 days.

(21) Appl. No.: 14/505,301

(22) Filed: Oct. 2, 2014

(65) Prior Publication Data

US 2016/0098970 A1  Apr. 7, 2016

(51) Int. Cl.
*G09G 5/02* (2006.01)
*G06T 1/20* (2006.01)
*G06T 11/00* (2006.01)

(52) U.S. Cl.
CPC ........... *G09G 5/02* (2013.01); *G06T 1/20* (2013.01); *G06T 11/001* (2013.01); *G09G 2320/0673* (2013.01)

(58) Field of Classification Search
CPC ............ G09G 5/02; G09G 2320/0673; G09G 2340/0407; G09G 5/363; G06T 1/20;
(Continued)

(56) References Cited

U.S. PATENT DOCUMENTS

| 4,910,611 A * | 3/1990 | Cok ................ G06T 1/60 358/452 |
| 6,339,433 B1 * | 1/2002 | Politis ............ G06T 15/503 345/581 |

(Continued)

FOREIGN PATENT DOCUMENTS

| AU | 2007202158 A1 | 12/2008 |
| WO | WO-2016/050946 A1 | 4/2016 |

OTHER PUBLICATIONS

"Color gradient", Wikipedia, [Online]. Retrieved from the Internet: <URL: http://en.wikipedia.org/w/index.php?title=Color_gradient&printable=yes>, (Accessed Jul. 29, 2014), 3 pgs.
(Continued)

*Primary Examiner* — Xilin Guo
(74) *Attorney, Agent, or Firm* — Schwegman Lundberg & Woessner, P.A.

(57) ABSTRACT

Methods and systems of generating an image gradient are presented. In one example, image data for generating a two-dimensional digital image is provided to a hardware graphics processor. The image data may include a single pixel along a first direction of the digital image and multiple pixels along a second direction of the digital image. The pixels along the second direction of the digital image may include an image gradient. A one-dimensional stretching operation of the hardware graphics processor is initiated based on the image data to generate the digital image. In response to the stretching operation, the digital image may include multiple pixels along the first direction for each of the single pixels, wherein each of the multiple pixels along the first direction for a corresponding pixel of the single pixels comprises the corresponding pixel.

20 Claims, 6 Drawing Sheets

(58) Field of Classification Search
CPC ......... G06T 11/001; G06T 11/00; G06T 1/00; G06T 3/0093; G06F 12/0862; G06F 1/60; G06F 12/0875; G06F 12/08; G06F 3/038; G06F 3/04815; G06F 3/04842; G06F 3/04845; A61G 7/1019; G06K 9/78

See application file for complete search history.

(56) References Cited

U.S. PATENT DOCUMENTS

| | | | |
|---|---|---|---|
| 6,879,327 | B1 | 4/2005 | Mathur |
| 2004/0086200 | A1* | 5/2004 | Aas .................. G06T 3/403 382/298 |
| 2004/0164992 | A1* | 8/2004 | Gangnet ............ G06T 11/001 345/591 |
| 2004/0194020 | A1 | 9/2004 | Beda et al. |
| 2010/0054621 | A1* | 3/2010 | Qi .................... G06T 3/403 382/260 |
| 2013/0117684 | A1* | 5/2013 | Ingole ............. G06F 3/04817 715/744 |
| 2013/0287265 | A1* | 10/2013 | Nepomniachtchi ..................... G06K 9/00442 382/115 |
| 2013/0343653 | A1* | 12/2013 | Hashiguchi ........ G06K 9/00973 382/190 |
| 2014/0184630 | A1* | 7/2014 | Krig .................. G06F 12/0862 345/557 |
| 2015/0378014 | A1* | 12/2015 | Koudelka ............... G01S 13/04 342/25 A |

OTHER PUBLICATIONS

"Image gradient", Wikipedia, [Online]. Retrieved from the Internet: <URL: http://en.wikipedia.org/w/index.php?title=Image_gradient&printable=yes>, (Accessed Jul. 29, 2014), 4 pgs.

"HTML canvas createLinearGradient ( ) Method", [Online]. Retrieved from the Internet: <URL: http://web.archive.org/web/20120922151217/http://www.w3schools.com/tags/canvas_createlineargradient.asp>, (Sep. 22, 2012), 1 pg.

"International Application Serial No. PCT/US2015/072765, International Search Report dated Jan. 21, 2016", 4 pgs.

"International Application Serial No. PCT/US2015/072765, Written Opinion dated Jan. 21, 2016", 6 pgs.

"International Application Serial No. PCT/EP2015/072765, International Preliminary Report on Patentability dated Apr. 4, 2017", 7 pgs.

\* cited by examiner

ACCELERATED IMAGE GRADIENT BASED ON ONE-DIMENSIONAL DATA

FIELD

This application relates generally to the field of data processing and, in an example embodiment, to accelerated generation of an image gradient based on one-dimensional data.

BACKGROUND

In the field of digital image graphics, an image gradient is a directional change in color (often termed a color gradient) and/or intensity of an image along one or more directions of picture elements (pixels). An image gradient may be applied to the entirety of an image or a portion thereof. One example of an image gradient is a one-dimensional gradient, in which the gradient causes a change in color or intensity of the image along a single direction or axis. In many cases, a one-dimensional gradient is aligned either vertically or horizontally relative to an orientation of an observer of the gradient, although diagonal orientations for one-dimensional gradients are also possible. In some implementations, the gradient may be based on a continuous density function, wherein the color and/or intensity of each of the pixels of a digital image are associated with a corresponding value of the function.

Another example of an image gradient is a two-dimensional image gradient, in which the color and/or intensity of an image change along two directions. In many instances, the two directions are orthogonal, such as vertically and horizontally, or diagonally to the left and diagonally to the right. However, two-dimensional image gradients are not necessarily so constrained, and may be aligned along any two axes of a two-dimensional image that are not necessarily orthogonal.

Image gradients have often been employed in graphical user interfaces (GUIs) of any number or type of electronic devices, such as desktop computers, laptop computers, game systems, set-top boxes, tablet computers, smart phones, and so on. Further, image gradients may be employed to provide realistic features, such as shadows, to an image, or merely to provide some visual interest to the image.

BRIEF DESCRIPTION OF DRAWINGS

Embodiments are illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of the embodiments disclosed herein. It will be evident, however, to one skilled in the art that the embodiments may be practiced without these specific details.

Figure 1:
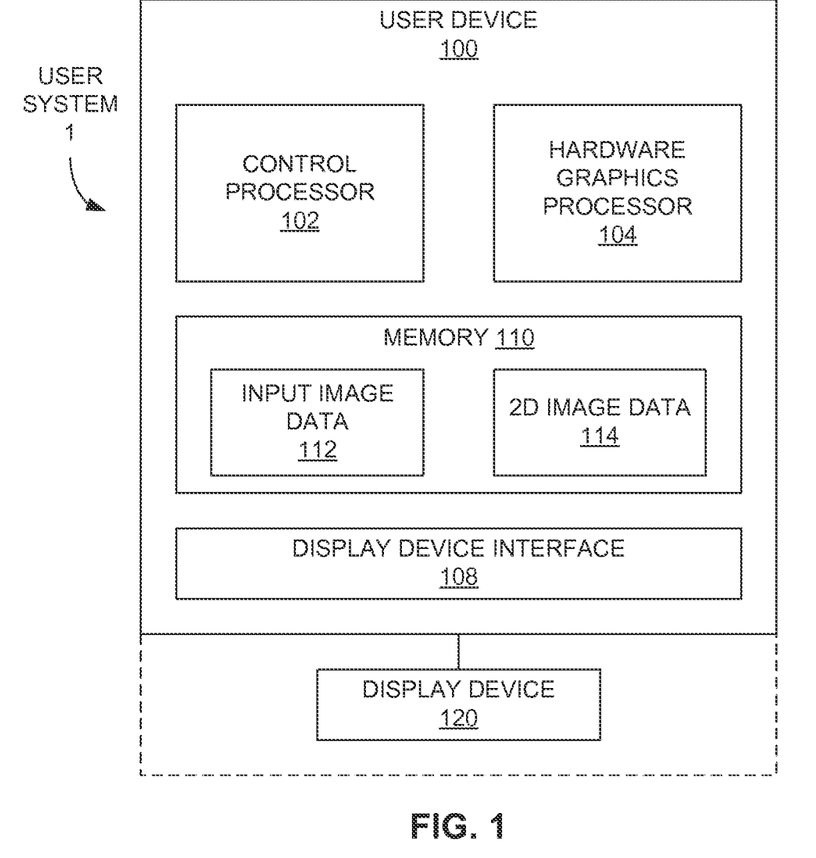
FIG. 1 is a block diagram of an example user system employable for generating an image gradient.

FIG. 1 is a block diagram of an example user system 1 employable for generating an image gradient in a digital image. In the examples described below, the image gradient being generated is a one-dimensional image gradient within a two-dimensional digital image. In other examples, however, the generated image gradient may be a one-dimensional gradient incorporated within a three-dimensional digital image for systems that support three-dimensional graphics.

In the example of FIG. 1, the user system 1 may include a user device 100 and a display device 120. The display device 120 may be included as part of the user device 100, or may exist as a separate device or system communicatively coupled via a wired or wireless communication connection to the user device 100. Examples of the display device 120 may include, but are not limited to, a television, a computer monitor, a touchscreen, or any other device or component configured to display digital images. Examples of the user device 100 may include, but are not limited to, a media gateway, a television set-top box, a television, a gaming system, a streaming device (e.g., a Roku®), a desktop computer, a laptop computer, a tablet computer, a smart phone, and a personal digital assistant (PDA).

The user device 100, as depicted in FIG. 1, may include at least one control processor 102, a hardware graphics processor 104, a display device interface 108, and a memory 110. The memory 110 may include input image data 112 employed to generate a two-dimensional image using the hardware graphics processor 104. In some examples, the memory 110 may also include or store two-dimensional image data 114 representing the generated two-dimensional image. In at least some embodiments, the user device 100 may include other components or devices, including, but not limited to, a user input interface (e.g., a keyboard, touchpad, joystick, mouse, and so on), a power supply, a communication network interface (e.g., an interface for a wide area network (WAN), a local area network (LAN), a cellular telephone network (e.g., a third-generation (3G) or fourth-generation (4G) network), and/or a Bluetooth® connection), and the like. However, such components are not discussed herein to simplify and focus the discussion provided hereafter.

The at least one control processor 102 may include one or more central processing units (CPUs), microprocessors, microcontrollers, or any other type of processor that may be configured or programmed to perform the functions ascribed to it herein, such as, for example, generating the input image data 112 and controlling the hardware graphics processor 104 to generate the two-dimensional image data 114 based on the input image data 112. The control processor 102 may be a hardware-only processor (e.g., one or more integrated circuits (ICs), possibly including one or more field-programmable gate arrays (FPGAs)) or an algorithmic hardware processor capable of executing software or firmware instructions.

The hardware graphics processor 104 may include one or more graphics processing units (CPUs) or any other hardware units configured to execute one or more operations for producing the two-dimensional digital image represented by the two-dimensional image data 114 based on the input image data 112 generated by the control processor 102. To that end, the hardware graphics processor 104 may be configured to execute a one-dimensional "stretching" or "filling" graphics operation that may receive the input image data 112 and use that data to generate the two-dimensional image data 114. In one example, the hardware graphics processor 104 may implement the one-dimensional stretching operation using a stretching/shrinking operation that may be applied to image data of any size up to some maximum size. Further, a one-dimensional stretching operation may enlarge the size of an input image along a single dimension or direction, either vertically or horizontally, by duplicating and/or interpolating pixels of the input image data to generate the larger output image. Oppositely, a one-dimensional shrinking operation may reduce the size of an input image along a single dimension or direction, either vertically or horizontally, by removing pixels of the input image data to produce the smaller output image. In some embodiments, the hardware graphics processor 104 may be configured to execute two-dimensional stretching/shrinking commands, but such commands are not the focus of the various embodiments discussed herein.

The memory 110 may be any rewritable memory, including, but not limited to, dynamic random access memory (DRAM) and static random access memory (SRAM), capable of storing the input image data 112, and possibly the two-dimensional image data 114 generated therefrom. While the same memory 110 is illustrated in FIG. 1 as including both the input image data 112 and the two-dimensional image data 114, the input image data 112 and the two-dimensional image data 114 may be stored in separate memory modules or sections. In one example, the two-dimensional image data 114 may be stored in a frame buffer or similar memory structure that may be accessed by the hardware graphics processor 104 or that may reside within the hardware graphics processor 104. Presuming a frame buffer or similar structure is employed, the two-dimensional image data 114 may also be accessed within that structure via the display device interface 108 for presentation to a user via the display device 120.

Accordingly, the display device interface 108 may be configured to access the two-dimensional image data 114 and provide that data 114 in some form usable by the display device 120 to the display device 120 for presentation to the user. Depending on the particular display device 120 being employed, the display device interface 108 may incorporate, for example, a coaxial video interface, a composite video interface, a component video interface, a high-definition multimedia interface (HDMI), an internal graphical or visual display interface of a standard or proprietary design, or any other interface capable of delivering the two-dimensional image data 114 for display to a user as a digital image.

Figure 2:
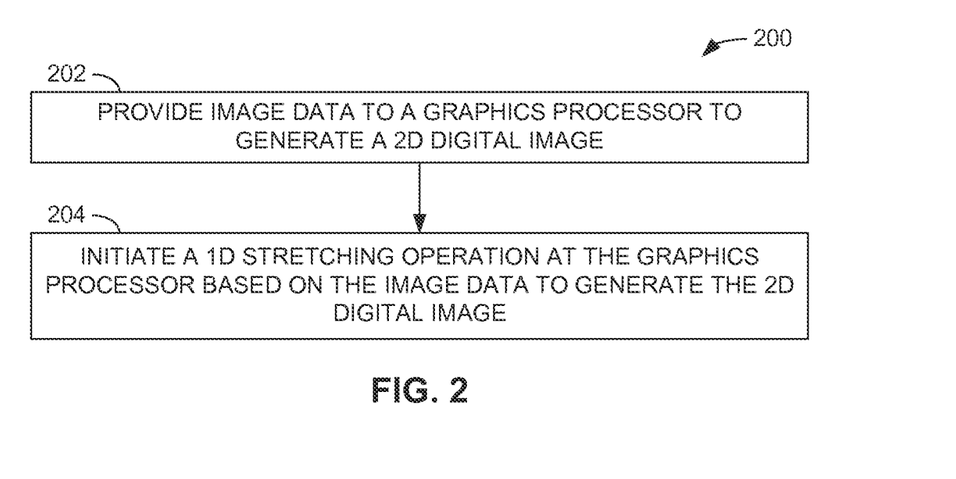
FIG. 2 is a flow diagram of an example method of generating an image gradient.

FIG. 2 is a flow diagram of an example method 200 of generating an image gradient. While the following discussion of the method 200 presumes the use of the user device 100 of FIG. 1, other user devices or systems not explicitly discussed herein may also be employed to perform the operations of method 200 in some embodiments.

In the method 200, at least one control processor 102 may provide input image data 112 to the hardware graphics processor 104 to generate two-dimensional image data 114 (operation 202). In one example, the input image data 112 may be one pixel in length along one direction and multiple pixels in length along a second direction that is perpendicular or orthogonal to the first direction. In addition, the multiple pixels along the second direction may represent an image gradient, such as, for example, a color gradient, an intensity gradient, a transparency gradient, or the like. As employed herein, an image gradient may be represented by any sequence of pixels for which at least the intensity, color, transparency, and/or other aspect or trait of the pixel changes over the pixel sequence. Also, in some examples, the first direction may be a horizontal direction and the second direction may be a vertical direction, or vice-versa.

Figure 4:
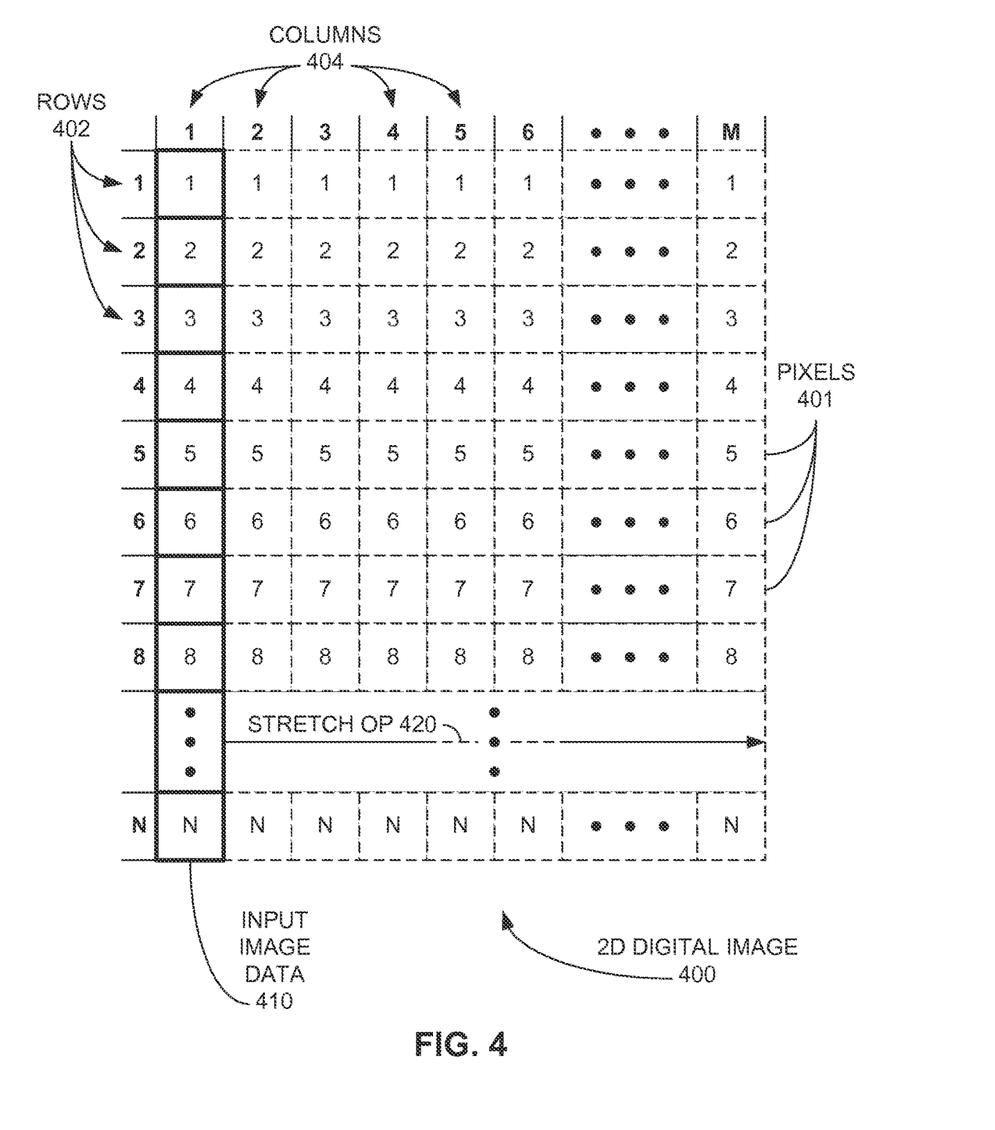
FIG. 4 is a graphical representation of the generation of a two-dimensional digital image from vertically-oriented input image data using a hardware graphics processor.
Figure 5:
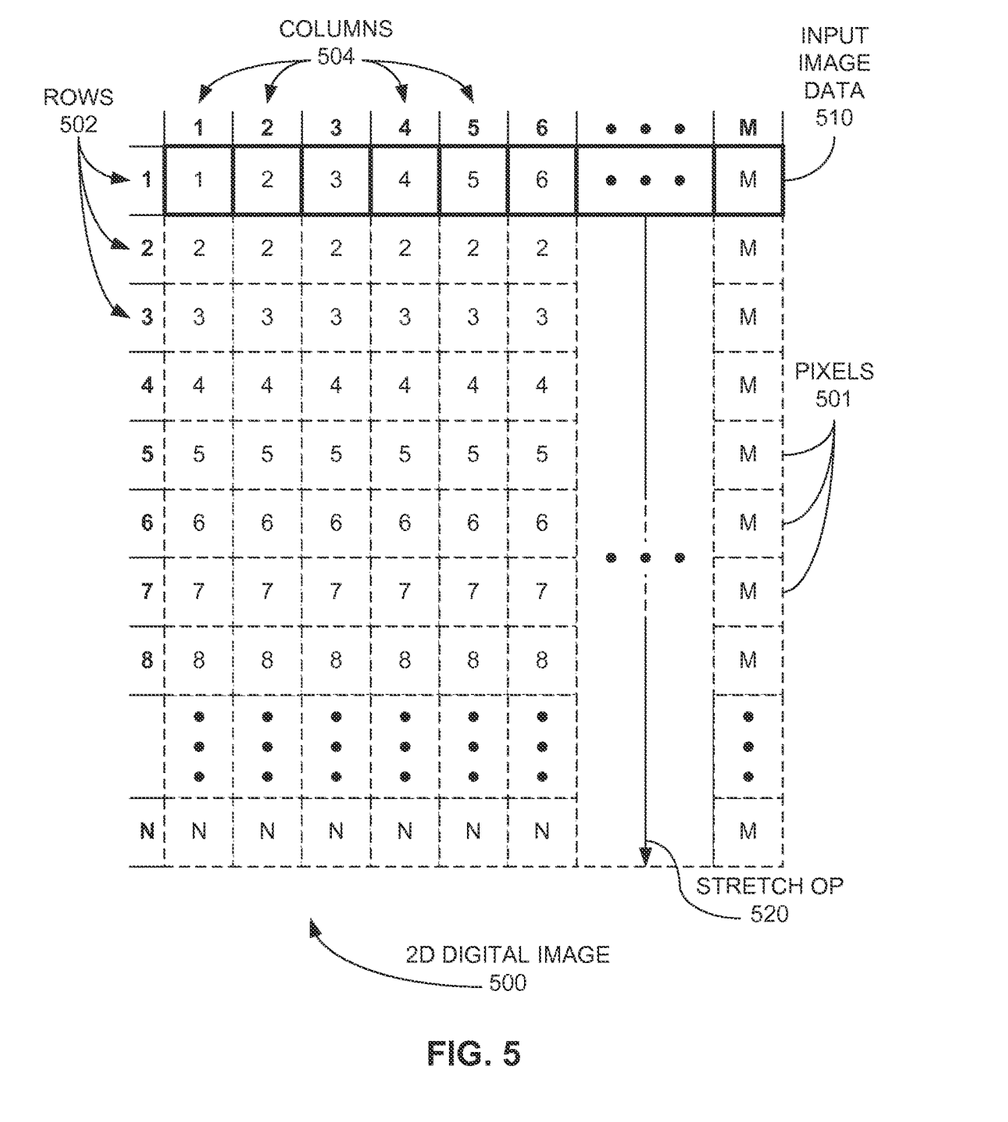
FIG. 5 is a graphical representation of the generation of a two-dimensional digital image from horizontally-oriented input image data using a hardware graphics processor.

The at least one control processor 102 may then initiate a one-dimensional stretching operation at the hardware graphics processor 104 based on the provided input image data 112 to generate the two-dimensional image data 114 (operation 204). In one example, the two-dimensional image data 114, as a result of the one-dimensional stretching operation, includes multiple pixels along the first direction for each corresponding one of the single pixels of the input image data. 112, with each of the multiple pixels being a copy of its corresponding single pixel. FIGS. 4 and 5, described in detail below, each illustrate an example of the input image data 112 and the two-dimensional image data. 114 resulting from the one-dimensional stretching operation. The two-dimensional image data 114 may then be provided to the display device 120 via the display device interface 108 for presentation of the two-dimensional image to a user.

While the operations 202 and 204 of FIG. 2 are shown as occurring in a specific order, concurrent or overlapping execution of those operations, as well as operations of other methods described herein, are also possible. In one example, while the hardware graphics processor 104 is performing the one-dimensional stretching operation of a first set of input image data 112, the at least one control processor 102 may be generating anchor providing a subsequent set of input image data 112. In other examples, the operations 202 and 204 may be performed in some other repetitive manner, possibly in a parallel, simultaneous, or concurrent fashion.

Figure 3:
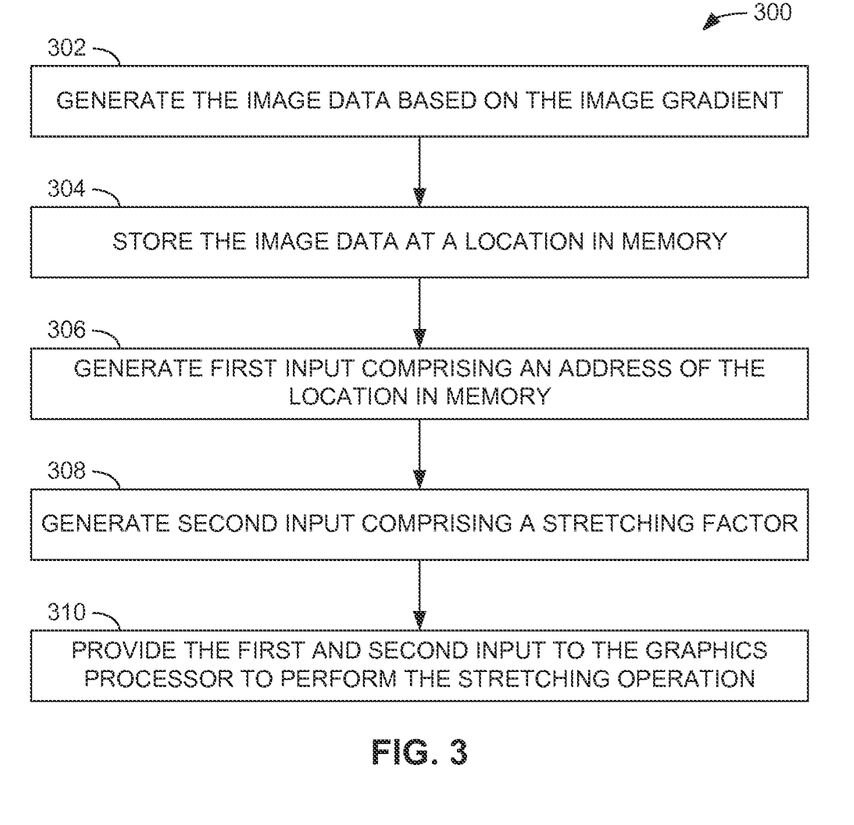
FIG. 3 is a flow diagram of another example method of generating an image gradient.

FIG. 3 is a flow diagram of another example method 300 of generating an image gradient. As with the method 200 of FIG. 2, while the following discussion of the method 300 presumes the use of the user device 100 of FIG. 1, other user devices or systems not explicitly discussed herein may also be employed to perform the operations of method 300 in other embodiments.

In the method 300, the at least one control processor 102 may generate the input image data 112 based on an image gradient (operation 302). In one example, the control processor 102 may employ a formula. or equation, such as a continuous density function relating a position of each of the multiple pixels along the second direction of the digital image to one or more aspects of that pixel, such as intensity, transparency, color, and the like. Examples of a continuous density function may include, but are not limited to, linear functions, parabolic functions, and so on. In other examples, the at least one control processor 102 may employ a discontinuous function, such as a saw-tooth, stair-step, or pulse-train function, to determine one or more aspects of each of the multiple pixels along the second direction. In yet other embodiments, the at least one control processor 102 may set the values of the aspects of each of the multiple pixels along the second direction randomly, on a pixel-by-pixel basis, or by any other deterministic or non-deterministic basis.

The control processor 102 may store the generated input image data 112 at a location in the memory 110 (operation 304) and then generate a first input for the hardware graphics processor 104 that indicates an address of the location of the input image data 112 in the memory 110 (operation 306). In another example, the control processor 102 may store the input image data 112 in a location of the memory 110 at which the hardware graphics processor 104 expects the input image data 112 for execution of a one-dimensional stretching operation. Consequently, in that case, the control processor 102 may not provide an explicit first input indicating the address of the location of the input image data. 112 in the memory 110.

The control processor 102 may also generate a second input for the hardware graphics processor 104 that indicates a stretching factor for a one-dimensional stretching operation to be performed by the hardware graphics processor 104 (operation 308). In one embodiment, the stretching factor may indicate how much the input image data 112, which may specify the multiple pixels along the second direction of the image, are to be stretched or copied along the first direction. For example, for an image that is intended to be a particular number of pixels along the first direction, the control processor 102 may set the stretching factor to be one less than the number of pixels along the first direction.

The control processor 102 may then provide the first input and the second input to the hardware graphics processor 104 before, or as part of, the initiation of the one-dimensional stretching operation at the hardware graphics processor 104. In other embodiments, the control processor 102 may supply different, fewer, or additional input values for the stretching operation. For example, the control processor 102 may provide an input indicating a position along the first direction at which the input image data 112 is located, as well as a second input indicating which way along the first direction (e.g., left or right along a horizontal direction, up or down along a vertical direction, etc.) the input image data 112 is to be stretched or duplicated. In some examples, the stretching may occur bath ways along the first direction.

FIG. 4 is a graphical representation of the generation of a two-dimensional digital image 400 based on two-dimensional image data 114 generated from vertically-oriented input image data 410 using the hardware graphics processor 104. As depicted in FIG. 4, the two-dimensional digital image 400 is represented by a set of pixels 401 visually arranged as a two-dimensional array of N horizontal rows 402 of pixels 401 by M vertical columns 404 of pixels 401. To generate the two-dimensional image data 114 for the two-dimensional digital image 400, the input image data. 410 may be interpreted as a single vertical column of N pixels 401, with a value (e.g., an indication of one or more values for the intensity, transparency, color, and/or other aspects) of each of the pixels 401 of the input image data 410 indicated by numbers 1 through N corresponding to the one of the rows 402 of the two-dimensional digital image 400. As described above, the values of the input image data 410 may represent some image gradient, such as a linear, parabolic, or some other deterministic or non-deterministic gradient.

Presuming the input image data 410 is to be placed at the extreme left side of the two-dimensional digital image 400, a horizontal stretching operation 420 to the right having a stretching factor of M-1, as initiated by the control processor 102 at the hardware graphics processor 104, may then result in each of the pixels 401 of the input image data 410 being duplicated M-1 times to the right to fill the pixels 401 of the two-dimensional digital image 400. In one example, the size of the two-dimensional digital image 400 (e.g., N-by-M pixels) may fill or match the dimensions of the display device 120. In other embodiments, the size of the two-dimensional digital image 400 may be less in the vertical and/or horizontal directions than one or both dimensions of the display device 120. While the stretching operation 420 of FIG. 4 is configured such that the input image data 410 is presumed to be located on the extreme left end of the two-dimensional digital image 400, and is configured to fill the pixels 401 toward the right end of the digital image 400, the stretching operation 420 may instead be configured to presume that the input image data. 410 is to be located at the extreme right end of the two-dimensional digital image 400, and may be configured to fill the pixels 401 toward the left end of the digital image 400. In yet another example, the stretching operation 420 may be configured to place the input image data 410 at some column 404 other than the leftmost column (e.g., column 1) or the rightmost column (e.g., column M) and be configured to duplicate the pixels 401 of the input image data 410 horizontally in both the left and right directions.

FIG. 5 is a graphical representation of the generation of a two-dimensional digital image 500 based on two-dimensional image data 114 generated from horizontally-oriented input image data 510 using the hardware graphics processor 104. As shown in FIG. 5, the two-dimensional digital image 500 is represented by a set of pixels 501 visually arranged as a two-dimensional array of N horizontal rows 502 of pixels 501 by M vertical columns 504 of pixels 501, in a manner similar to that of FIG. 4. However, in this example, to generate the two-dimensional image data 114 for the two-dimensional digital image 500, the input image data 510 may be interpreted as a single horizontal row of M pixels 501, with a value (e.g., an indication of one or more values for the intensity, transparency, color, and/or other aspects) of each of the pixels 501 of the input image data 510 indicated by numbers 1 through M corresponding to the one of the columns 504 of the two-dimensional digital image 500. As discussed earlier, the values of the input image data 510 may represent some image gradient.

Presuming the input image data 510 is to be placed at the extreme top end of the two-dimensional digital image 500, a vertical stretching operation 520 from top to bottom having a stretching factor of N-1, as initiated by the control processor 102 at the hardware graphics processor 104, may then result in each of the pixels 501 of the input image data 510 being duplicated N-1 times toward the bottom to fill the pixels 501 of the two-dimensional digital image 500. As before, the size of the two-dimensional digital image 500 (e.g., pixels) may fill or match the dimensions of the display device 120. In other embodiments, the size of the two-dimensional digital image 500 may be less in the vertical and/or horizontal directions. Also, while the stretching operation 520 of FIG. 5 is configured such that the input image data 510 is presumed to be located at the extreme top end of the two-dimensional digital image 500, and may be configured to fill the pixels 501 toward the bottom end of the digital image 500, the stretching operation 520 may instead be configured to presume that the input image data 510 is to be located at the extreme bottom end of the two-dimensional digital image 500, and may he configured to fill the pixels 501 toward the top end of the digital image 500. In other embodiments, the stretching operation 520 may be configured to place the input image data 510 at some row 502 other than the topmost row (e.g., row 1) or the bottommost row (e.g., row N) and to duplicate the pixels 501 of the input image data 510 vertically in both the up and down directions.

In both the examples of FIG. 4 and FIG. 5, the hardware graphics processor 104 may store or forward the resulting two-dimensional digital image 400 and 500 to a frame buffer or other memory construct accessible by the display device interface 108 so that the two-dimensional digital image 400, 500 may be presented on the display device 120 to a user. In some examples, the two-dimensional digital image 400, 500 may be stored in a temporary location so that other operations, such as, for example, overlaying and possibly animating another image atop the two-dimensional digital image 400, 500 may be performed without regenerating the two-dimensional digital image 400, 500 using the stretching operation 420, 520 of the hardware graphics processor 104. Also, in some embodiments, the two-dimensional digital image 400, 500 may be presented to the user as part of a GUI, such as, for example, a background area upon which selectable menu items may be presented to the user to allow user activation of commands, selection of command options, and the like.

In at least some of the embodiments described above, at least one control processor may employ a one-dimensional stretching operation or command provided by a hardware graphics processor to generate two-dimensional graphical images in which an image gradient is provided along one of the dimensions. In such embodiments, the control processor may generate or specify, and subsequently store, the gradient along one dimension, such as a row or column, of the two-dimensional image, thus reducing the amount of memory consumed to represent the image. Also, by employing the hardware graphics processor to generate the overwhelming majority of the image, thus relieving the control processor of that burden, the overall image generation may be accelerated while allowing the control processor to perform other operations.

Additionally, in at least some embodiments, the use of input image data dimensioned as a single row (or column) by multiple columns (or rows) of pixels, as described above, as input for a hardware graphics processor may avoid the generation of common visual artifacts associated with the stretching or expansion of extremely small images to significantly larger images. In fact, image data as narrow as two pixels along one dimension, in which some variation in color, intensity, or transparency is employed across the two pixels, when expanded or stretched along that same dimension, will often result in a blurry or blocky image, depending on the particular algorithm employed in the hardware graphics processor to perform the stretching operation. For example, two-pixel-wide image data that exhibits a black-and-white checkerboard pattern, when stretched using a nearest-neighbor interpolation algorithm, may generate a pattern in which the left and right halves of the resulting stretched image are inverted relative to each other. In another example, the same two-pixel-wide image data, when stretched using a bilinear interpolation algorithm, may generate a stretched image in which the center of the image converges to grey. Oppositely, when single-pixel-wide image data is employed, as described in conjunction with at least some of the embodiments disclosed herein, such artifacts are eliminated in the resulting stretched or expanded image.

Figure 6:
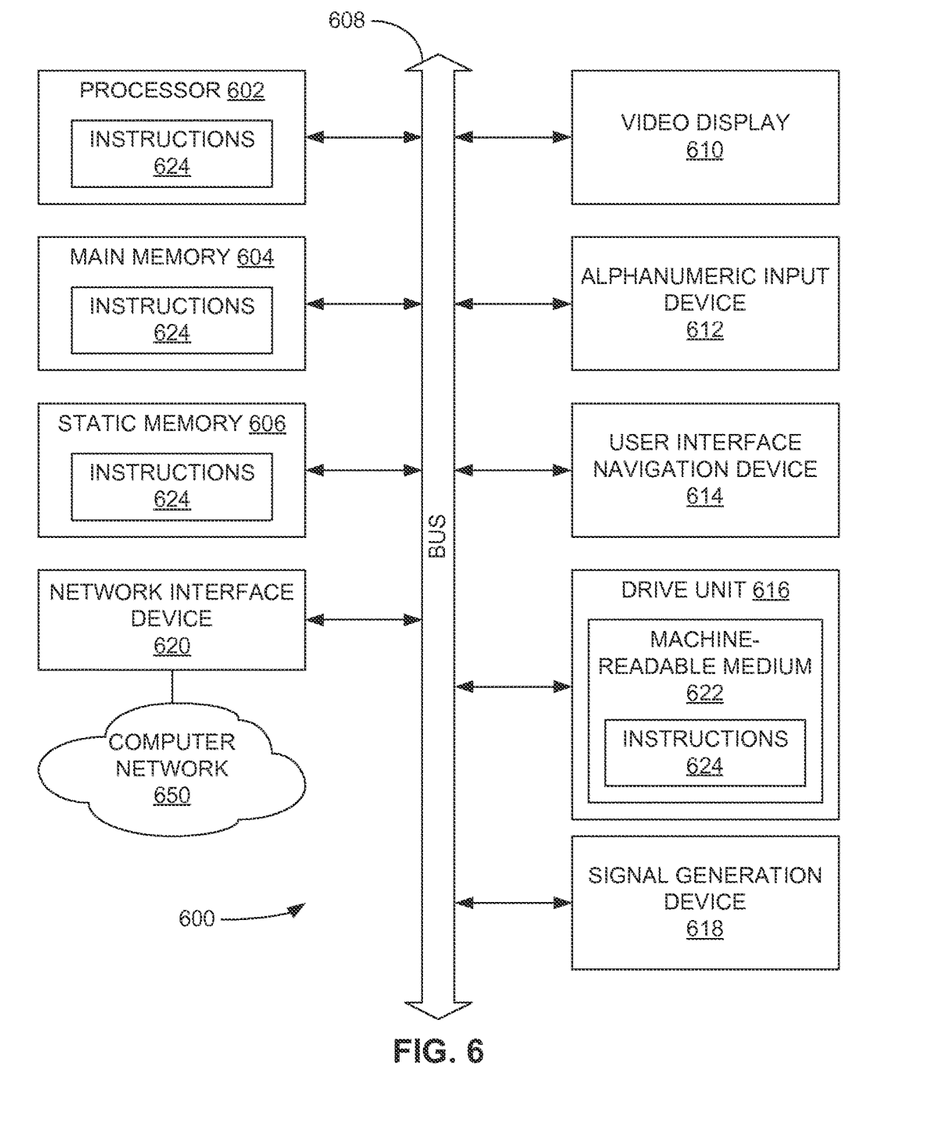
FIG. 6 is a diagrammatic representation of a machine in the example form of a computer system within which a set of instructions may be executed for causing the machine to perform any one or more of the methodologies discussed herein.

FIG. 6 illustrates a diagrammatic representation of a machine in the example form of a computer system 600 within which a set of instructions 624 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer, a tablet computer, a set-top box (STB), a personal digital assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606 which communicate with each other via a bus 608. The computer system 600 may further include a video display 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a disk drive unit 616, a signal generation device 618 (e.g., a speaker), and a network interface device 620.

The disk drive unit 616 includes a machine-readable medium 622 on which is stored one or more sets of instructions and data structures (e.g., instructions 624) embodying or utilized by any one or more of the methodologies or functions described herein. The instructions 624 may also reside, completely or at least partially, within the static memory 606, within the main memory 604, and/or within the processor 602 during execution thereof by the computer system 600, the main memory 604 and the processor 602 also constituting machine-readable media.

The instructions 624 may further be transmitted or received over a computer network 650 via the network interface device 620 utilizing any one of a number of well-known transfer protocols (e.g., HyperText Transfer Protocol (HTTP)).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions 624. The term "machine-readable medium" shall also be taken to include any medium that is capable of storing, encoding or carrying a set of instructions 624 for execution by the machine and that cause the machine to perform any one or more of the methodologies of the present inventive subject matter, or that is capable of storing, encoding or carrying data structures utilized by or associated with such a set of instructions 624. The term "machine-readable medium" shall accordingly be taken to include, but not be limited to, solid-state memories, and optical and magnetic media.

Throughout this specification, plural instances may implement components, operations, or structures described as a single instance. Although individual operations of one or more methods are illustrated and described as separate operations, one or more of the individual operations may be performed concurrently, and the operations may be performed in an order other than that illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application-specific integrated circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry configured by software) may be driven by cost and time considerations, Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein, As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. it is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The Abstract of the Disclosure is provided to comply with 37 C.F.R. § 1.72(b), requiring an abstract that will allow the reader to quickly ascertain the nature of the technical disclosure. The Abstract is submitted with the understanding that it will not be used to interpret or limit the scope or meaning of the claims. in addition, in the foregoing Detailed Description, it can be seen that various features are grouped together in a single embodiment for the purpose of streamlining the disclosure. This method of disclosure is not to be interpreted as reflecting an intention that the claimed embodiments include more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Although embodiments of the present disclosure have been described with reference to specific example embodiments, it will be evident that various modifications and changes may be made to these embodiments without departing from the broader scope of these embodiments. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of generating an image gradient, the method comprising:
   creating, using a hardware control processor, one-dimensional image data for generating two-dimensional image data using a hardware graphics processor, the one-dimensional image data comprising a single pixel along a first dimension of the two-dimensional digital image and multiple pixels along a second dimension of the two-dimensional digital image, the multiple pixels along the second dimension of the two-dimensional image data comprising an image gradient;
   storing the one-dimensional image data in a first memory;
   providing input to the hardware graphics processor, the input comprising an address of a location of the one-dimensional image data in the first memory; and
   initiating, after the providing of the input to the hardware graphics processor, a one-dimensional stretching operation of the hardware graphics processor based on the one-dimensional image data, the initiating of the one-dimensional stretching operation causing the hardware graphics processor to perform operations comprising:
      accessing the one-dimensional image data in the first memory;
      generating, based on the one-dimensional image data, the two-dimensional image data, a dimension length of the two-dimensional image data along the second dimension being equal to a dimension length of the one-dimensional image data along the second dimension, the generated two-dimensional image data comprising multiple pixels along the first dimension for each pixel of the multiple pixels of the one-dimensional image data, each pixel of the multiple pixels of the two-dimensional image data along the first dimension being a copy of the pixel of the one-dimensional image data; and
      storing the generated two-dimensional image data in a second memory.

2. The method of claim 1, wherein:
the first dimension comprises a horizontal dimension; and
the second dimension comprises a vertical dimension orthogonal to the horizontal dimension.

3. The method of claim 1, wherein:
the first dimension comprises a vertical dimension; and
the second dimension comprises a horizontal dimension orthogonal to the vertical dimension.

4. The method of claim 1, wherein:
a dimension length corresponding to the first dimension of the two-dimensional image data equals a dimension length of a first dimension of a display unit employed to display a two-dimensional image based on the two-dimensional image data; and
the dimension length corresponding to the second dimension of the two-dimensional digital data equals a dimension length of a second dimension of the display unit employed to display the two-dimensional image.

5. The method of claim 1, wherein a dimension length corresponding to the first dimension of the two-dimensional image data is less than a dimension length of a corresponding dimension of a display unit employed to display a two-dimensional image based on the two-dimensional image data.

6. The method of claim 1, wherein a dimension length corresponding to the second dimension of the two-dimensional image data is less than a dimension length of a corresponding dimension of a display unit employed to display a two-dimensional image based on the two-dimensional image data.

7. The method of claim 1, wherein the image gradient comprises an intensity gradient.

8. The method of claim 1, wherein the image gradient comprises a color gradient.

9. The method of claim 1, wherein the image gradient comprises one of a solid-to-transparent gradient or a transparent-to-solid gradient.

10. The method of claim 1, wherein the generating, based on the one-dimensional image data, of the two-dimensional image data comprises duplicating each of the multiple pixels of the one-dimensional image data a number of times along the first dimension of the two-dimensional image data, wherein the number of times equals one less than a number of the multiple pixels along the first dimension of the two-dimensional image data.

11. The method of claim 1, wherein the input to the hardware graphics processor comprises a first input to the hardware graphics processor, the method further comprising:
providing a second input to the hardware graphics processor, the second input comprising a stretching factor equal to one less than a number of the multiple pixels along the first dimension of the two-dimensional image data;
wherein the initiating of the one-dimensional stretching operation occurs after the providing of the first input and the second input to the hardware graphics processor.

12. The method of claim 1, further comprising:
employing a two-dimensional image based on the two-dimensional image data in a graphical user interface presented on a display device.

13. The method of claim 12, wherein the display device comprises the hardware control processor and the hardware graphics processor.

14. The method of claim 12, wherein an electronic device communicatively coupled with the display device comprises the hardware control processor and the hardware graphics processor.

15. A non-transitory computer-readable storage medium storing instructions that, when executed by at least one processor, cause the at least one processor to perform first operations comprising:
creating one-dimensional image data for generating two-dimensional image data using a hardware graphics processor, the one-dimensional image data comprising a single pixel along a first dimension of the two-dimensional digital image and multiple pixels along a second dimension of the two-dimensional digital image, the multiple pixels along the second dimension of the two-dimensional image data comprising an image gradient;
storing the one-dimensional image data in a first memory;
providing input to the hardware graphics processor, the input comprising an address of a location of the one-dimensional image data in the first memory; and
initiating, after the providing of the input to the hardware graphics processor, a one-dimensional stretching operation of the hardware graphics processor based on the one-dimensional image data, the initiating of the one-dimensional stretching operation causing the hardware graphics processor to perform second operations comprising:
accessing the one-dimensional image data in the first memory;
generating, based on the one-dimensional image data, the two-dimensional image data, a dimension length of the two-dimensional image data along the second dimension being equal to a dimension length of the one-dimensional image data along the second dimension, the generated two-dimensional image data comprising multiple pixels along the first dimension for each pixel of the multiple pixels of the one-dimensional image data, each pixel of the multiple pixels being a copy of the pixel of the one-dimensional image data; and
storing the two-dimensional image data in a second memory.

16. A system, comprising:
a hardware graphics processor configured to perform a one-dimensional stretching operation on one-dimensional image data;
one or more hardware control processors; and
a memory storing instructions that, when executed by at least one of the one or more hardware control processors, cause the one or more hardware control processors to perform first operations comprising:
creating one-dimensional image data for generating two-dimensional image data using the hardware graphics processor, the one-dimensional image data comprising a single pixel along a first dimension of the two-dimensional digital image and multiple pixels along a second dimension of the two-dimensional digital image, the multiple pixels along the second dimension of the two-dimensional image data comprising an image gradient;
storing the one-dimensional image data in a first data memory;
providing input to the hardware graphics processor, the input comprising an address of a location of the one-dimensional image data in the first data memory; and
initiating, after the providing of the input to the hardware graphics processor, a one-dimensional stretching operation of the hardware graphics processor based on the one-dimensional image data, the initiating of the one-dimensional stretching operation causing the hardware graphics processor to perform second operations comprising:
accessing the one-dimensional image data in the first memory;
generating, based on the one-dimensional image data, the two-dimensional image data, a dimension length of the two-dimensional image data along the second dimension being equal to a dimension length of the one-dimensional image data along the second dimension, the generated two-dimensional image data comprising multiple pixels along the first dimension for each pixel of the multiple pixels of the one-dimensional image data, each pixel of the multiple pixels being a copy of the pixel of the one-dimensional image data; and
storing the two-dimensional image data in a second memory.

17. The system of claim 16, wherein the generating, based on the one-dimensional image data, of the two-dimensional image data, comprises duplicating each of the multiple pixels of the one-dimensional image data a number of times along the first dimension of the two-dimensional image data, wherein the number of times equals one less than a number of the multiple pixels along the first dimension of the two-dimensional image data.

18. The system of claim 16, wherein the input to the hardware graphics processors comprises a first input to the hardware graphics processor, the first operations further comprising:
providing a second input to the hardware graphics processor, the second input comprising a stretching factor equal to one less than a number of the multiple pixels along the first dimension of the two-dimensional image data; and wherein the initiating of the one-dimensional stretching operation occurs after the providing of the first input and the second input to the hardware graphics processor.

19. The system of claim 16, further comprising:

a display device;

wherein the first operations further comprise employing a two-dimensional image based on the two-dimensional image data in a graphical user interface presented on the display device.

20. The system of claim 16, further comprising:

a media content device comprising the one or more hardware control processors and the hardware graphics processor.

* * * * *

UNITED STATES PATENT AND TRADEMARK OFFICE
CERTIFICATE OF CORRECTION

PATENT NO. : 10,032,435 B2  
APPLICATION NO. : 14/505301  
DATED : July 24, 2018  
INVENTOR(S) : Newcombe et al.

Page 1 of 1

It is certified that error appears in the above-identified patent and that said Letters Patent is hereby corrected as shown below:

On the Title Page

In item (72), in "Inventors", in Column 1, Line 1, before "Vale of Glamorgan", insert --Hayes Point Sully,--

In item (72), in "Inventors", in Column 1, Line 2, before "Pontyclun", insert --Llanharan,--

In the Claims

In Column 13, Line 3, in Claim 10, after "data", insert --,--

Signed and Sealed this  
First Day of December, 2020

Andrei Iancu  
*Director of the United States Patent and Trademark Office*